(12) United States Patent
Kramer et al.

(10) Patent No.: US 9,836,945 B2
(45) Date of Patent: Dec. 5, 2017

(54) WIRELESS APPLIANCE VIBRATION SENSOR MONITOR AND METHOD

(71) Applicants: Mark Kramer, Castle Rock, CO (US); Wilfred Tucker, Centennial, CO (US); John Sample, Centennial, CO (US); Christopher Bermel, Denver, CO (US)

(72) Inventors: Mark Kramer, Castle Rock, CO (US); Wilfred Tucker, Centennial, CO (US); John Sample, Centennial, CO (US); Christopher Bermel, Denver, CO (US)

( * ) Notice: Subject to any disclaimer, the term of this patent is extended or adjusted under 35 U.S.C. 154(b) by 3 days.

(21) Appl. No.: 13/690,124

(22) Filed: Nov. 30, 2012

(65) Prior Publication Data

US 2017/0162028 A1    Jun. 8, 2017

(51) Int. Cl.
| | |
|---|---|
| *G08B 17/10* | (2006.01) |
| *G08B 21/18* | (2006.01) |
| *G05B 19/02* | (2006.01) |
| *G01H 1/00* | (2006.01) |
| *G01H 1/12* | (2006.01) |

(52) U.S. Cl.
CPC ............ *G08B 21/182* (2013.01); *G01H 1/003* (2013.01); *G01H 1/12* (2013.01); *G05B 19/02* (2013.01); *G08B 21/187* (2013.01)

(58) Field of Classification Search
CPC ........ G08B 25/08; G08B 25/10; G08B 13/08; G08B 13/1409; G08B 13/1427; G08B 217/103
USPC .......... 340/669, 545.1, 511, 545.6, 614, 630, 340/426.16, 568.1, 633, 572.8, 693.5, 340/693.7, 693.12; 600/587
See application file for complete search history.

(56) References Cited

U.S. PATENT DOCUMENTS

| | | |
|---|---|---|
| 5,847,658 A | 12/1998 | Irie et al. |
| 5,955,669 A | 9/1999 | Egami |
| 6,006,164 A | 12/1999 | McCarty et al. |
| 6,032,109 A | 2/2000 | Ritmiller |
| 6,205,872 B1 | 3/2001 | Pflueg |
| 6,297,742 B1 | 10/2001 | Canada et al. |
| 6,820,026 B1 | 11/2004 | Schoch |
| 6,963,740 B1 * | 11/2005 | Guthery ............. H04L 63/0428 379/189 |
| 7,093,492 B2 | 8/2006 | Treiber et al. |
| 7,174,277 B2 * | 2/2007 | Vock .................. A43B 3/0005 340/545.6 |
| 7,424,403 B2 | 9/2008 | Robinson et al. |
| 2004/0066302 A1 * | 4/2004 | Menard ................ G08B 25/08 340/669 |

(Continued)

*Primary Examiner* — Hoi Lau
(74) *Attorney, Agent, or Firm* — Gearhart Law LLC

(57) ABSTRACT

The apparatus disclosed is a wireless vibration sensor monitor and recorder along with the associated system and method of use. The apparatus contains a digital accelerometer that operates off six axes. The apparatus may also include features such as a temperature sensor and ambient light sensor. The system actively monitors time and battery voltage level, as well as records information pertinent to the health of the apparatus. Once affixed to an appliance or piece of machinery, the apparatus monitors the duration of the cycle and the vibrations produced to compile a cycle profile. Once the apparatus has determined the cycle or predetermined period to be complete, a notification is sent to a remote user. This signal may be received by any compatible Bluetooth low energy device.

25 Claims, 4 Drawing Sheets

(56) References Cited

U.S. PATENT DOCUMENTS

| | | | |
|---|---|---|---|
| 2005/0006109 A1* | 1/2005 | McSheffrey | A61N 1/39 169/75 |
| 2005/0030179 A1* | 2/2005 | Script | G08B 13/08 340/545.1 |
| 2005/0051213 A1* | 3/2005 | Clemens | A47L 15/421 137/392 |
| 2005/0128067 A1* | 6/2005 | Zakrewski | G08B 29/20 340/511 |
| 2007/0120692 A1* | 5/2007 | McSheffrey, Jr. | G08B 25/10 340/614 |
| 2007/0229293 A1* | 10/2007 | Martino | G08B 17/103 340/630 |
| 2007/0272023 A1 | 11/2007 | Dwyer | |
| 2008/0030330 A1* | 2/2008 | Vock | A43B 3/00 340/568.1 |
| 2008/0042809 A1* | 2/2008 | Watts | B60R 25/1003 340/426.16 |
| 2008/0117852 A1* | 5/2008 | Bennett | H04L 12/189 370/312 |
| 2008/0165547 A1* | 7/2008 | Amor | B63B 45/02 362/373 |
| 2008/0169932 A1 | 7/2008 | Desrosiers | |
| 2009/0091338 A1* | 4/2009 | Tischendorf | G01N 33/18 324/694 |
| 2009/0107873 A1* | 4/2009 | Cotton | B65D 75/327 206/531 |
| 2009/0126100 A1* | 5/2009 | Kenoyer | F24H 1/0081 4/559 |
| 2009/0224914 A1* | 9/2009 | Wehrenberg | G08B 13/1409 340/568.1 |
| 2009/0248326 A1 | 10/2009 | Greening | |
| 2009/0281497 A1* | 11/2009 | Kamen | A61M 5/1413 604/151 |
| 2010/0302025 A1* | 12/2010 | Script | G01P 15/09 340/539.1 |
| 2011/0005258 A1* | 1/2011 | Audet | F25D 27/005 62/264 |
| 2011/0144574 A1* | 6/2011 | Kamen | A61M 5/14224 604/67 |
| 2011/0246124 A1* | 10/2011 | Lill | G05B 19/0428 702/141 |
| 2012/0056746 A1* | 3/2012 | Kaigler | A61B 5/0022 340/573.1 |
| 2012/0146463 A1* | 6/2012 | Ng | H05K 1/0292 310/338 |
| 2012/0191151 A1* | 7/2012 | Kameli | A61N 1/36535 607/6 |
| 2012/0235791 A1* | 9/2012 | Donlan | G06Q 50/28 340/10.1 |
| 2012/0286973 A1* | 11/2012 | Czompo | H04W 4/046 340/933 |
| 2012/0293330 A1* | 11/2012 | Grant | G08B 13/1427 340/568.8 |
| 2013/0036796 A1* | 2/2013 | Fleury, Jr. | G01M 3/00 73/40.5 R |
| 2013/0046153 A1* | 2/2013 | Hyde | A61B 5/4833 600/302 |
| 2013/0079668 A1* | 3/2013 | Stein | A61B 5/686 600/587 |
| 2013/0079671 A1* | 3/2013 | Stein | A61B 5/686 600/587 |
| 2013/0106603 A1* | 5/2013 | Weast | G06F 1/163 340/539.11 |
| 2014/0028470 A1* | 1/2014 | Ali | G08C 15/06 340/870.03 |
| 2014/0055614 A1* | 2/2014 | Kahan | G08G 1/166 348/148 |
| 2015/0194040 A1* | 7/2015 | Fiedler | G08B 21/182 340/870.09 |
| 2015/0248833 A1* | 9/2015 | Arne | G01D 21/00 340/870.07 |
| 2015/0294553 A1* | 10/2015 | Logan | G05B 19/042 340/539.1 |
| 2017/0162028 A1* | 6/2017 | Kramer | G08B 21/182 |

* cited by examiner

WIRELESS APPLIANCE VIBRATION SENSOR MONITOR AND METHOD

CROSS REFERENCE TO RELATED APPLICATIONS

This application is a non-provisional application of U.S. Provisional Application Ser. No. 61/565,591 filed on Dec. 1, 2011 entitled: "Wireless Appliance Vibration Sensor Monitor And Method" which is hereby incorporated by reference in its entirety.

FIELD

The field of the invention relates to an apparatus and system for monitoring the operational cycles of various appliances and wirelessly transmitting information obtained by the apparatus.

BACKGROUND

In today's day society, people rely heavily on various appliances to help complete many daily tasks. These can be short lived, as is with raising a garage door, which would be quite arduous without a garage door opening system, or the longer operations associated with machinery such as washers and HVAC systems. These appliances can often be placed or used in areas where an alert, such as a buzzer, emitted by the appliance is not sufficient to alert the user of the completion of a cycle or other appliance associated action. This causes issues to arise, most notably involving time sensitive activities or in processes which a user desires to complete in an orderly fashion without constant personal monitoring.

There have been other attempts by individuals and corporations to solve the issue at hand. However, the other attempts to resolve this issue have fallen short of the desired goals. Other similar apparatus use antedated technology that limits its functionality. These outdated systems require the use of specifically designed and proprietary technology that is not compatible with other systems. This clearly limits the user as to how and when the technology can be applied. Additionally, other comparable systems use unidirectional communications. This, in turn, limits the capabilities of the remote user and requires any adjustments to be made to the apparatus itself rather than remotely. Finally, other systems and apparatus are prone to false readings and thus results in false alerts sent to the remote user. This can be due to a multitude of factors including user error and improper readings of machine cycles.

In light of the aforementioned problems, there is a need for an improvement to be made to existing technology to combat these issues and to become more user friendly.

SUMMARY

The present invention involves the wireless monitoring and subsequent notifications involving various appliances. In one embodiment of the invention, the apparatus provides for bidirectional communication between the apparatus and a compatible device. This permits user manipulation, such as sensitivity settings for various internal components, from a remote location. Additionally, the user can view and monitor information recorded and sent to the user's receiving device and manipulate the settings therefrom in real time.

In one aspect of the invention, there is a wireless vibration sensor and monitor comprising of an external housing. The external housing comprises at least two parts that when connected to one another form a protective outer covering with a hollow interior. The interior holds at least a digital accelerometer, printed circuit board, wireless low power transceiver, application microcontroller, and a battery. The wireless vibration sensor and monitor may also have a temperature sensor, ambient light sensor, at least one light emitting diode (LED), at least two analog to digital converting metal contact pins, and at least one configurable button.

The apparatus employs a digital accelerometer which operates on six axes. This inclusion means that the settings of the accelerometer can be manipulated by the user through the dedicated transceiver via the central processing unit (CPU). The digital accelerometer enables the user to have finer and more precise settings and thus help limit false alerts sent to the remote user. A gyroscope may also be used either in lieu of or in conjunction with the digital accelerometer. The gyroscope along with the analog input can measure the torque on a given appliance.

The apparatus, in another embodiment, also contains either a light sensor, temperature sensor, or both. The inclusion of these sensors provides the user with more information and the ability to manipulate and monitor the health and status of the attached appliances. Information gathered by these sensors can be transmitted to the user as part of the data packet that the apparatus typically sends to the remote user. The apparatus further contains a battery within the exterior casing. Like the other features of the apparatus, the data transmitted to the remote user contains battery voltage information in real time. This enables the remote user to know when a battery requires replacement before the unit ceases to function due to a lack of energy source.

Further, the wireless vibration sensor and monitor has a carrier. The carrier has at least one fingernail release tab for the wireless vibration sensor and monitor's quick release from the carrier. The external casing, and preferably the carrier, is formed from IP68 compliant plastic. The external casing also has at least one protruding tab on its exterior and at least two analog to digital converting (ADC) pins protruding from the interior.

In another aspect of the invention, there is an appliance monitoring system comprising the aforementioned wireless vibration sensor and monitor and a Bluetooth compatible device. The Bluetooth device permits the user to interact with the wireless vibration sensor and monitor remotely. The Bluetooth device may be any Bluetooth compatible device but is preferably a smart phone. The system's communication means includes broadcasting over the 2.4 GHz microwave spectrum. Through this frequency band, the apparatus employs secured encrypted point-to-point communication and frequency hopping spread spectrum (FHSS) communication. This allows for secure communications that cannot be manipulated by outside users. This is vital depending on the location or use of the desired appliance, especially in commercial and industrial settings.

In yet another aspect of the invention, there is a method of using a wireless vibration sensor and monitor comprising attaching the wireless vibration sensor and monitor to a desired appliance, setting the vibration sensitivity level to correspond to the desired appliance, monitoring the vibration level and active time period, and sending a wireless signal to a dedicated Bluetooth low energy device upon meeting predetermined thresholds.

BRIEF DESCRIPTIONS OF DRAWINGS

Preferred embodiments of the invention will now be described, by way of example, with reference to the accompanying drawings, in which.

DETAILED DESCRIPTION

Figure 1:
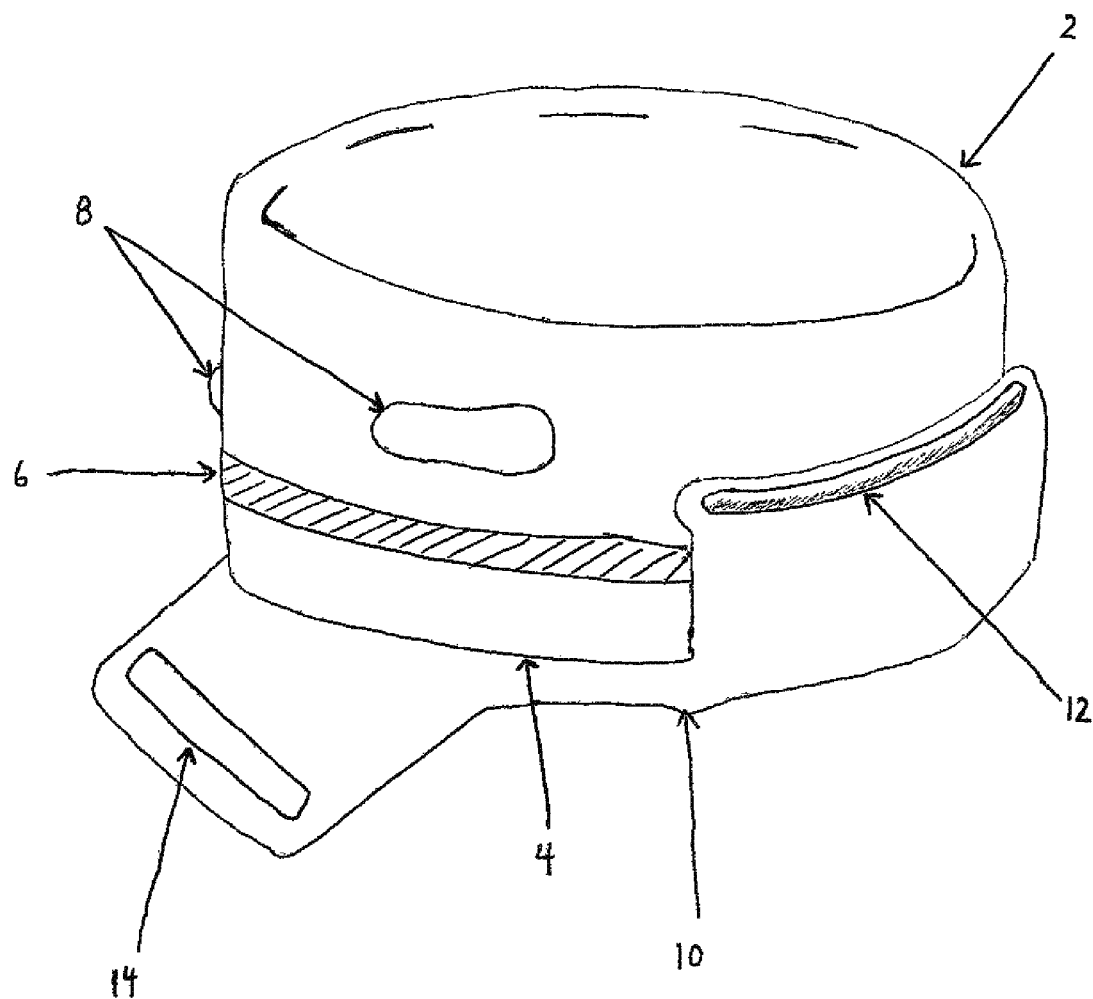
FIG. 1 illustrates a view of a fully assembled apparatus of a preferred embodiment.

Referring to the drawings, FIG. 1 refers to a preferred embodiment of a fully assembled apparatus. The top half of the external casing 2 is joined with the lower half of the external casing 4 to form the outer protective casing of the apparatus, and the internal components are contained therein. The top half of the external casing 2 and lower half of the external casing 4 are formed from an IP68 compliant plastic. The joint between the two halves is protected by an O-ring 6. The O-ring 6 can comprise different materials. These materials are selected based on chemical compatibility, operating temperature, sealing pressure, size, and cost.

On one half of the protective casing, there are at least one protrusion(s) from the external casing. These tabs 8 enable the user to grip the external casing and aid the user in moving or manipulating the external casing. The tabs 8 may be formed as part of the external casing as a whole. In other embodiments, the tabs 8 are of a separate material adhered to the surface of the external casing. The external casing fits snugly into a carrier 10. The carrier 10 has a tab 14 and at least one fingernail release 12 to aid the user in removing the apparatus from the carrier 10. The tab 14 enables the user to hang the apparatus or gives extra aid in handling, moving, or manipulating the apparatus.

Figure 2:
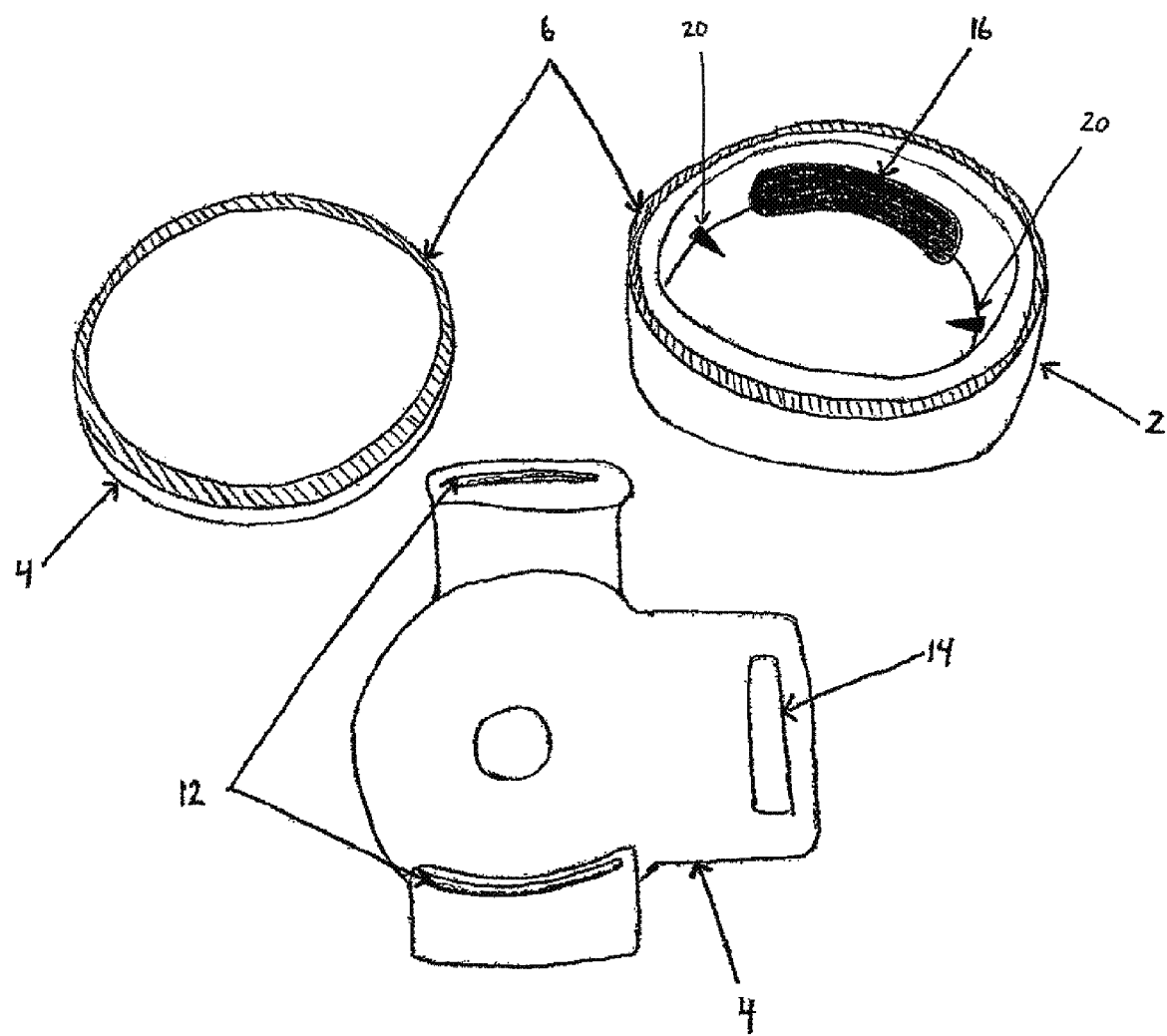
FIG. 2 illustrates a top view of the disassembled exterior components of a preferred embodiment.

FIG. 2 depicts the preferred embodiment of the exterior components in their disassembled form. The top half of the external casing 2 is separated from the lower half of the external casing 4. Inside the lower half of the external casing 4 is a support tab 16. The support tab 16 provides stability and support, as well as enabling the user to move or manipulate the interior components of the apparatus. The interior surface also includes at least two protruding analog to digital converting (ADC) metal contacts 20. The ADC metal contacts 20 utilize an analog to digital voltage differential input to determine the presence of water within the external casing. The O-ring 6 can be settled on either half of the external casing. The fingernail release(s) 12 are visible and demonstrate how one may manipulate them in such a way by bending slightly outward as to release the external casing.

Figure 3:
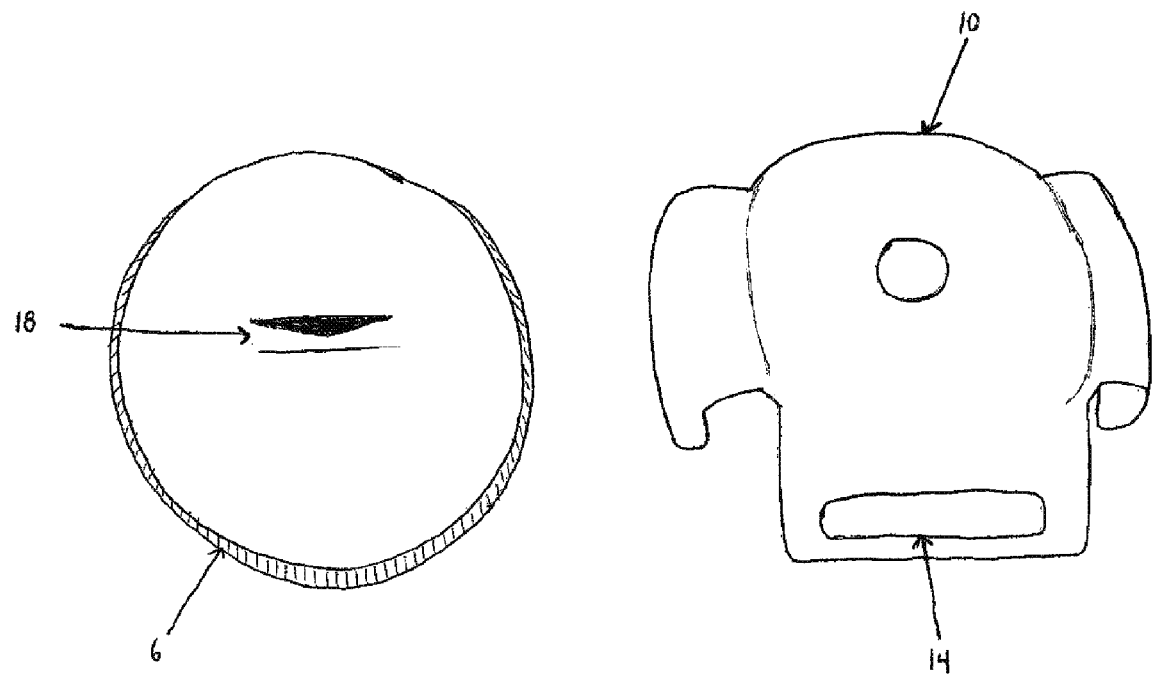
FIG. 3 illustrates a bottom view of the lower disassembled exterior components of a preferred embodiment.

In FIG. 3, the underside of the lower half of the external casing 4 contains a slot 18. The slot 18 is designed to interact with a coin or other similar edge in order to enable the user to separate the halves of the external casing in order to perform maintenance or manipulate the interior components of the apparatus. In some embodiments, the external casing may have grooves that lock the lower half of the external casing 4 and upper half of the external casing 2 by way of a clockwise or counterclockwise twisting motion. In other embodiments, the surfaces are smooth and fit together snugly due to a minute sizing differential between the two halves.

Figure 4:
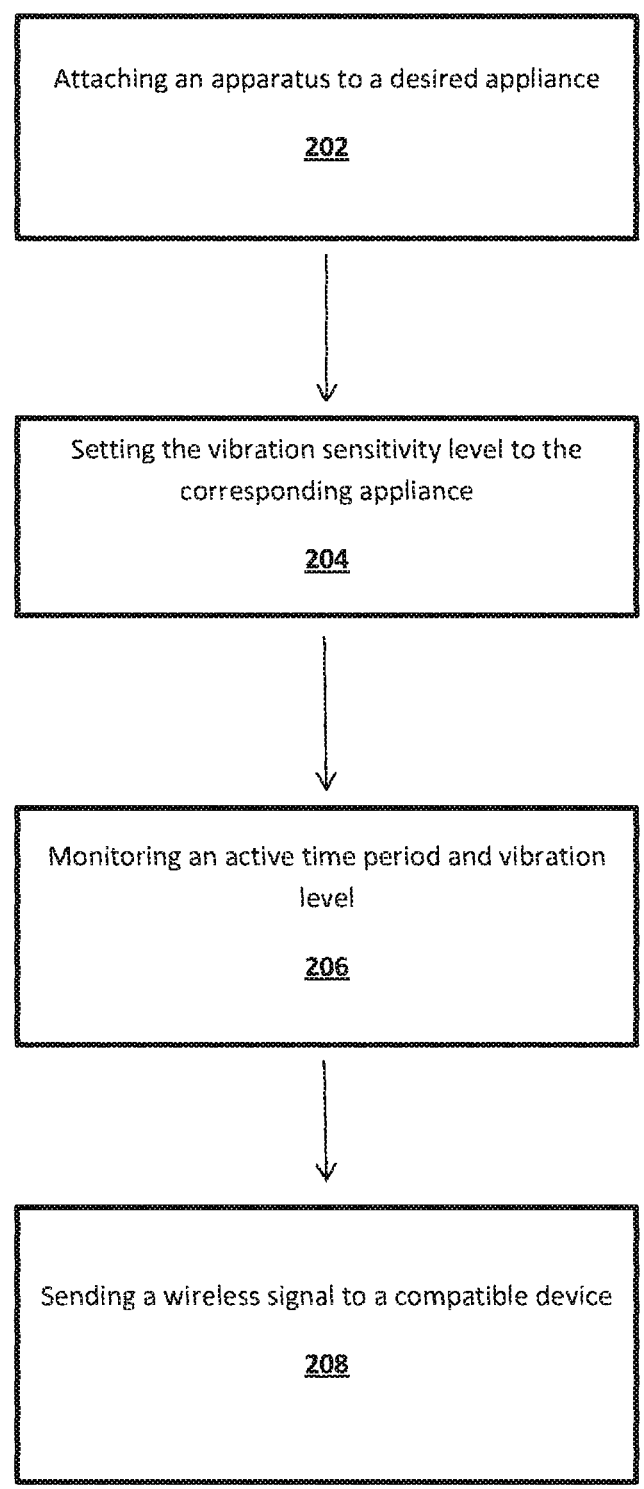
FIG. 4 is a flow chart demonstrating a method of use of a preferred embodiment.

FIG. 4 is a flow chart that refers to a preferred method of use for the apparatus. The user attaches the apparatus to the desired appliance 202. This appliance can be any number of types of machinery notably that put out most any type of vibration. Once the apparatus is attached to the desired appliance or machinery, the user the selects the vibration setting for the apparatus 204. This setting can be manipulated either manually or by the remote user using their Bluetooth receiver. The associated software may also provide for predetermined settings for measurable variables based on the make/model of the appliance. Additionally, this software may be updated wirelessly as new versions become available.

The Bluetooth receiver held and employed by the remote user can be any number of compatible items including, but not limited to, smart phones or other Bluetooth low energy compatible devices. This enables a wide range usage rather than only having its functionality tied to a particular system. The alerts or notifications sent to the user can take the form of any one or a combination of the following: vibrations, audible, SMS, or email. This removes undue costs and allows users to receive notifications on systems they are previously familiar and in turn have virtually no learning curve.

This enables the user to pick from predetermined or their own settings and to fine tune them to best achieve the desired results. The apparatus then monitors the time and vibration activity of the cycle of the appliance 206. The time and vibration, or lack their off, throughout the cycle is used to determine when the cycle is complete without the worry of sending a false signal to the remote user. When the cycle does complete, a wireless signal is sent from the apparatus to the remote user 208. This signal can take many forms including audio tones, visual cues, vibrations, or emails.

What is claimed is:

1. A wireless vibration sensor comprising:
    an external casing, the external casing having at least two sections with the at least two sections connected to one another forming an internal compartment housing an accelerometer, a wireless transceiver, a microcontroller, and a power source,
        wherein a sealing ring is disposed on a surface of one of the at least two sections of the external casing, and
        wherein a recess is disposed on an exterior surface of an underside of the external casing; and
    a carrier, the carrier having a first tab and a second tab, wherein the first tab and the second tab are configured to releasably engage the external casing.

2. The sensor of claim 1 further comprising a temperature sensor.

3. The sensor of claim 1 further comprising a light sensor.

4. The sensor of claim 1 wherein the carrier further comprises a third tab, the third tab having an aperture.

5. The sensor of claim 1 wherein the at least one first tab and at least one second tab have a recess disposed thereon.

6. The sensor of claim 2 wherein a sensitivity of the temperature sensor is user configurable.

7. The sensor of claim 3 wherein a sensitivity of the light sensor is user configurable.

8. The sensor of claim 1 further comprising at least two protrusions on an exterior surface of the external casing.

9. The sensor of claim 1 wherein the accelerometer is a digital accelerometer operating on six axes.

10. The sensor of claim 9 wherein a sensitivity of the accelerometer is user configurable.

11. The sensor of claim 1 further comprising at least one configurable button.

12. The sensor of claim 1 further comprising at least one light emitting diode.

13. The sensor of claim 1 wherein the external casing comprises an IP68 compliant plastic.

14. The sensor of claim 1 further comprising a support tab affixed to an interior surface of the external casing.

15. The sensor of claim 1 further comprising at least two metal contact pins protruding from an interior surface of the external casing.

16. An appliance monitoring system comprising:
- a wireless vibration sensor being coupled to an appliance, the wireless vibration sensor having an external casing, the external casing having at least two sections with the at least two sections coupled to one another and housing an accelerometer, a wireless transceiver, a microcontroller, two metal contact pins, and a power source, wherein a sealing ring is disposed on a surface of one of the at least two sections of the external casing, and wherein a recess is disposed on an underside of the external casing; and
- a carrier, the carrier having a first tab and a second tab, wherein the first tab and the second tab are configured to releasably engage the external casing; and
- an electronic device configured to establish a wireless communication connection with the wireless vibration sensor;
- wherein the wireless vibration sensor is configured to send a first signal to the electronic device upon completion of an operational cycle of the appliance;
- wherein the wireless vibration sensor is configured to send a second signal to the electronic device upon the presence of a voltage differential between the two metal contact pins.

17. The system of claim 16 wherein the voltage differential indicates the presence of a liquid within the exterior casing.

18. The system of claim 16 wherein the wireless vibration sensor communicates with the electronic device over the 2.4 GHz microwave band spectrum.

19. The system of claim 18 wherein the wireless vibration sensor employs secured encrypted point-to-point communication and frequency hopping spread spectrum (FHSS) communication.

20. A method of using a wireless vibration sensor, the method comprising the steps of:
- attaching the wireless vibration sensor of claim 1 to a desired appliance;
- setting a vibration sensitivity level of the wireless vibration sensor to correspond to an operational vibration pattern of the desired appliance;
- monitoring the operational vibration pattern of the desired appliance over a first time period; and
- sending a wireless signal to an electronic device upon the operational vibration pattern meeting a first threshold.

21. The method of claim 20 wherein the wireless vibration sensor is directly attached to the desired appliance with an adhesive.

22. The method of claim 20 wherein the vibration sensitivity level is configured to be set via the electronic device.

23. The method of claim 20 wherein the first threshold of the operational vibration pattern signifies a completion of an operational cycle of the desired appliance.

24. The method of claim 20 wherein software of the wireless vibration sensor is updated wirelessly.

25. The method of claim 20 wherein the wireless signal contains a data packet comprising time, battery voltage, sensitivity, appliance health, light, tilt, analog input, or temperature information.

* * * * *